Jan. 1, 1929.  E. W. SEAHOLM  1,697,785
VEHICLE BRAKE
Filed Nov. 12, 1923   3 Sheets-Sheet 1
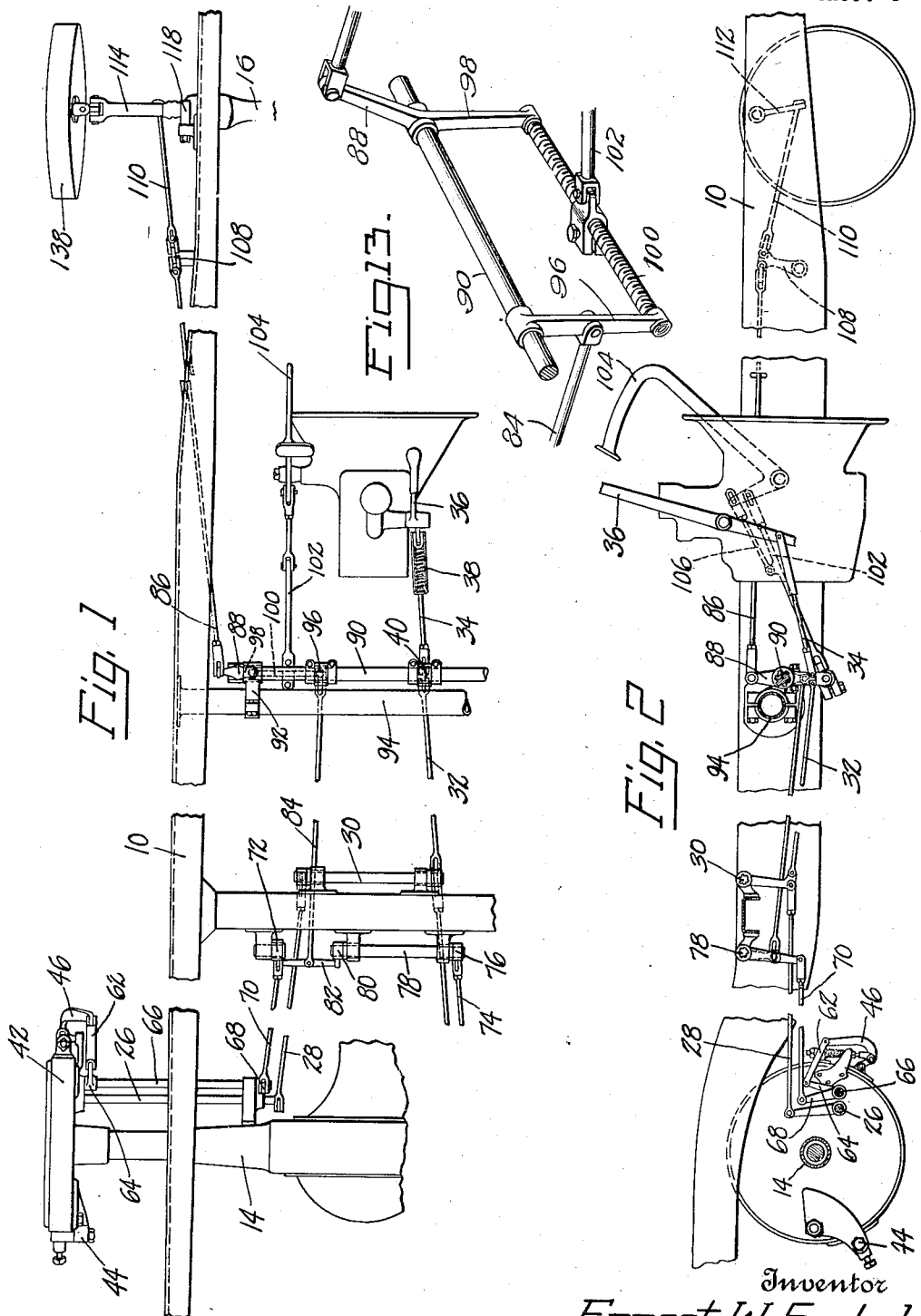
Inventor
Ernest W. Seaholm
By his Attorneys
Blackmore, Spencer & Flint Jan. 1, 1929.  E. W. SEAHOLM  1,697,785
VEHICLE BRAKE
Filed Nov. 12, 1923   3 Sheets-Sheet 2
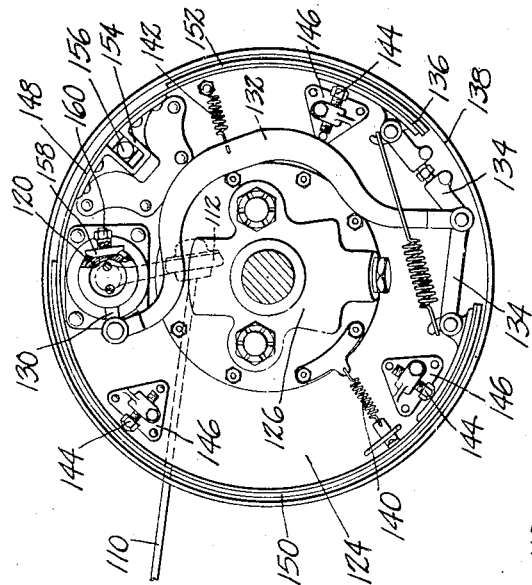
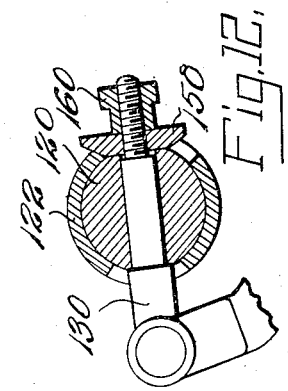
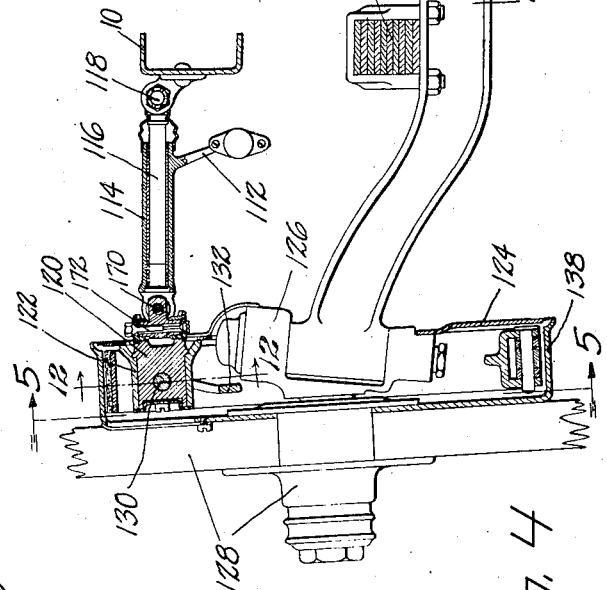
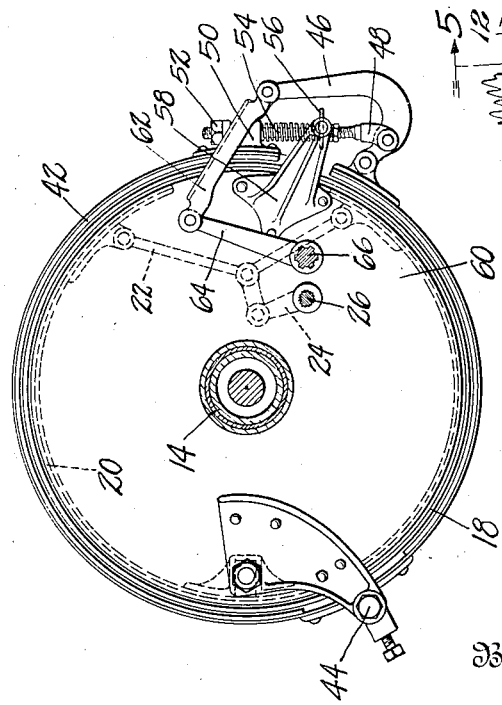
Inventor
*Ernest W. Seaholm*
By his Attorneys

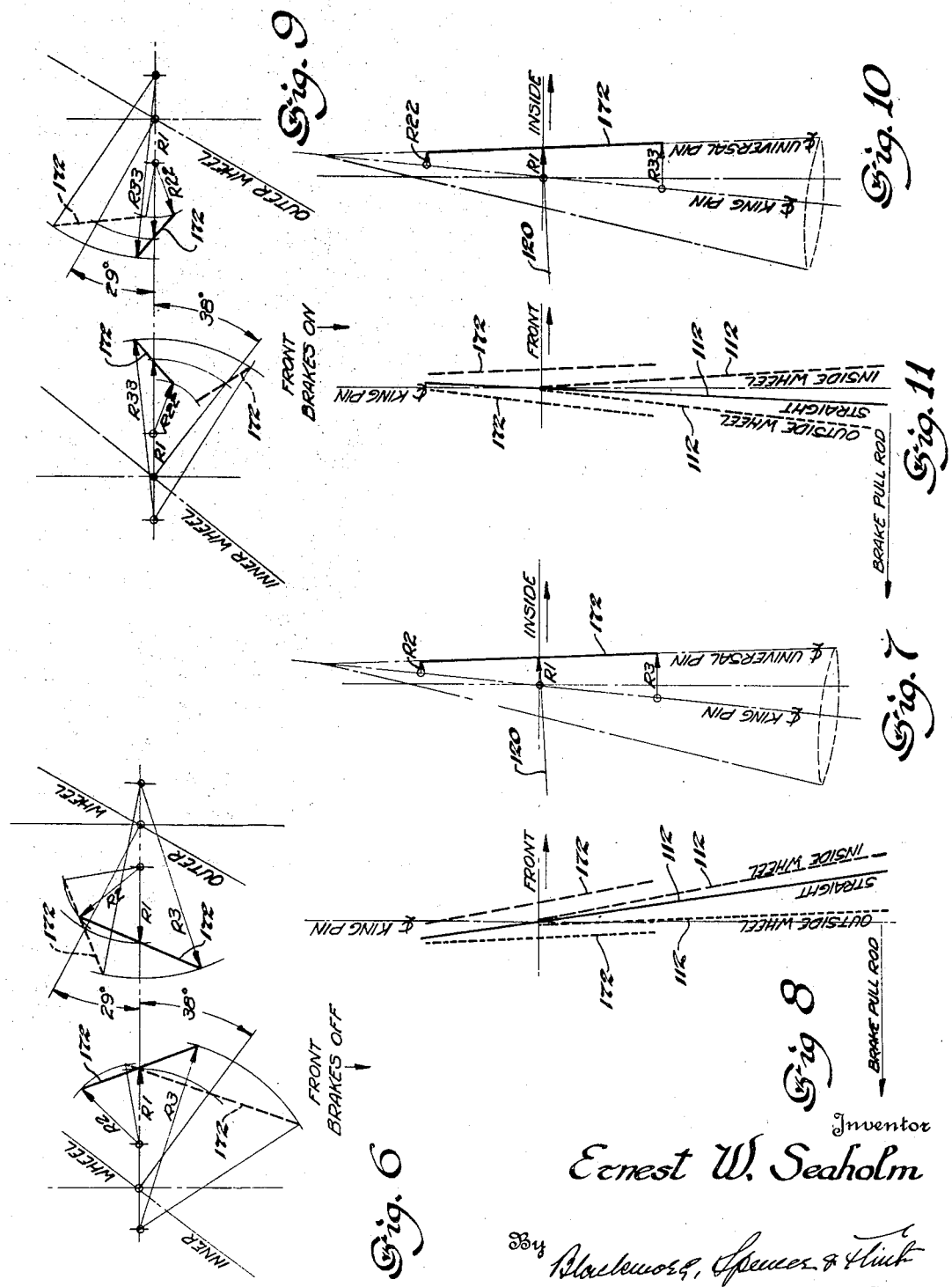

Patented Jan. 1, 1929.

1,697,785

UNITED STATES PATENT OFFICE.

ERNEST W. SEAHOLM, OF DETROIT, MICHIGAN, ASSIGNOR TO GENERAL MOTORS CORPORATION, OF DETROIT, MICHIGAN, A CORPORATION OF DELAWARE.

VEHICLE BRAKE.

Application filed November 12, 1923. Serial No. 674,235.

This invention relates to brakes, and is illustrated as embodied in the chassis of an automobile having brakes on all four of its wheels.

Among the objects of the invention are the arrangement of the brakes to provide uniform braking action no matter how highly the brake drums may become heated, as, for example, on a long hill, and the provision of improved connections for operating the brakes which will, without lessening the efficiency of the braking action, loosen the brake on the outer front wheel when the vehicle is rounding a corner. This loosening of the outer brake is desirable in positively preventing the loss of steering control of the vehicle by reason of skidding the front wheels due to locking the brakes, it being well known that the front wheels are only effective in guiding the vehicle in other than a straight line when they are rotating.

Having in view the provision of uniform braking action regardless of the length of time the brakes may be applied, the invention contemplates providing front and rear sets of brakes so designed that the brakes of one set tend to tighten as their drums become heated, while the brakes of the other set tend to release as their drums become heated, and connecting the two sets of brakes, as, for example, by balancing or equalizing connections, in such a manner that the tightening brakes tighten up on the releasing brakes and thus operate to release themselves so that the braking action on all four of the wheels is substantially uniform regardless of the temperature of the drums. In one desirable arrangement, external contracting brakes are used for the set which is expected to tend to tighten as the drums become heated, and internal expanding brakes are selected for the set which tends to release. Inasmuch as I consider it preferable that there be a slightly greater braking effect on the rear wheels than on the front wheels, I prefer to arrange the external contracting brakes on the rear wheels and the internal expanding brakes on the front wheels, it being well known that the same application of force will produce a greater braking effect on external than on internal brakes. Thus as the drums expand under the influence of heat, as, for example, on a long hill, the rear wheel brakes tend to tighten and the front brakes tend to release. Due to the described novel equalizing connections, however, the brakes automatically balance themselves, the front brakes being tightened up and the rear brakes slightly released so that the braking action is at all times substantially uniform.

As explained above, the invention also contemplates arranging the brakes so that the brake on the outer front wheel is automatically released when the vehicle is rounding a corner to prevent any possibility of locking both front wheels in such a manner that the vehicle would tend to go ahead in a straight line instead of obeying the steering wheel. Various methods have been proposed for securing this effect, and the present design comprises an improved application of one of these methods utilizing a novel particular construction and arrangement of a universal joint in the axis about which each front wheel swivels, which acts, as explained below, not only to release the outer brake, but also to increase very slightly the braking effect on the three other wheels.

The above and other objects and features of the invention, including various novel combinations of parts and desirable particular constructions, will be apparent from the following description of one illustrative embodiment shown in the accompanying drawings, in which Fig. 1 is a top plan view of part of the chassis of an automobile having brakes arranged as described above;

Fig. 2 is a view partly in section and partly in side elevation of the parts shown in Fig. 1;

Fig. 3 is a side elevation of one of the rear wheel brakes looking from the inside of the wheel;

Fig. 4 is a transverse vertical section showing one of the front wheel brakes and associated parts of the chassis;

Fig. 5 is a section on the line 5—5 of Fig. 4 showing the operating parts of the brake in side elevation looking from the outside of the wheel;

Fig. 6 is a diagram showing in plan view and four times full size the position of the vertical axis of the brake operating universal joint when the brakes are off and when the wheels are directed straight ahead and also when they are turned through a maximum angle to the right;

Fig. 7 is a diagram showing the parts of

Fig. 6, being a full size diagrammatic rear elevation of the parts associated with the right wheel;

Fig. 8 is a corresponding diagrammatic side elevation, full size, showing the relation of the various parts, the brake being off;

Fig. 9 is a view corresponding to Fig. 6, being a diagrammatic plan view with the parts four times full size, but with the brakes on substantially to the maximum extent;

Figs. 10 and 11 are, respectively, rear and side diagrammatic elevations, full size, corresponding to Figs. 7 and 8, but with the brakes on; and Figure 12 is an enlarged sectional view on the line 12—12 of Figure 4.

Figure 13 represents in perspective, the equalizer 100.

In the arrangement selected for illustration, the invention is shown as embodied in an automobile having a chassis frame 10 supported by springs 12 carried by the front axle 16 and by similar springs, not shown, carried by the rear axle 14. Each of the rear wheels is provided with brakes including a drum 18 within which is arranged an emergency brake shown as comprising an expanding band 20 operated by a toggle 22 linked to a rock arm 24 operated by a shaft 26. The shafts 26 on opposite sides of the vehicle are provided with operating arms connected by links 28 to operating arms on the shaft 30 connected by links 32 and 34 to the emergency brake lever 36. If desired, the connection to the lever 36 may be through a spring link 38. The links 32 and 34 are shown as being supported at an intermediate point by a freely swinging supporting lever 40. So far as relates to the present invention, the above described parts may be of any desired construction.

As explained above, one feature of the present invention relates to balancing the braking effect even on long hills by providing an automatic equalization as between the front and rear sets of brakes. As one efficient construction for securing the desired effect, the rear service brakes comprise external contracting bands, one of which is shown at 42. As will be apparent from Figs. 1, 2 and 3, each band 42 may be provided with an anchor 44 and operated by a toggle lever 46 directly pivoted to one end of the band and pivotally connected to a link 48 sliding through a perforated abutment 50 on the other end of the band and provided with lock nuts 52 serving as a stop to engage the abutment 50. The band 42 is normally held in its idle position by a spring 54 surrounding the link 48 and bearing at one end against the abutment 50 and at the other end against a fixed perforated lug 56 which surrounds the link 48 and which is integral with or carried by a fixed bracket 58 shown as being riveted to a stationary plate 60 carried by the rear axle 14. Each toggle lever 46 is connected by a link 62 to an arm 64 on a rock shaft 66 having an operating arm 68. The one arm 68 is connected by a link 70 to an arm 72 depending from a cross member of the frame 10, and the other arm 68 is connected by a link 74 to an arm 76 carried by a rock shaft 78 having a second operating arm 80 at its opposite end. The arms 72 and 80 are connected by an equalizer bar 82 operated to apply the brakes by a link 84.

The front brakes hereinafter described are operated by links 86 connected to arms 88 splined on a cross shaft 90 which may, if desired, serve as a support for the above described freely swinging arm 40 and which may be supported at its opposite ends by bearings carried by brackets 92 secured to a cross member 94 of the frame 10. The link 84 which operates the rear wheel brakes is also supported on a depending freely swinging arm 96 mounted on the shaft 90. The shaft 90 is rocked by a depending arm 98 secured thereto, and the arms 96 and 98 are operated by an equalizer bar 100 connected by a link 102 to the service brake pedal 104. Preferably, an auxiliary link 106 is provided to decrease the leverage of the pedal 104 as the brake linings wear away, in the manner and for the purpose explained in copending application S. N. 679,665, filed Dec. 10, 1923, by William R. Strickland.

As explained above, the front wheel brakes are operated by links 86 connected to arms 88 at opposite ends of the shaft 90, the front end of each link 86 being supported on an idler rocker arm 108 which has a lost motion connection, shown as a pin-and-slot connection (Fig. 1), with an operating link 110 connected to an arm 112 secured to or integral with a sleeve section 114 slidingly supported on a rod 116 supported by a ball-and-socket joint 118 on one of the side frame members of the chassis frame 10. The sleeve portion 114 of the described telescoping shaft is connected by a universal joint, further described below, to a cylindrical portion 120 journaled in a bearing 122 secured to or integral with a stationary plate 124 carried by a knuckle 126 having a spindle on which is journaled the corresponding front wheel 128. Each knuckle 126 is pivotally connected by any desired king pin construction with one end of the front axle 16 for swiveling movement under the control of the steering wheel about an axis which is preferably inclined to intersect the tread surface of the corresponding wheel 128 to provide what is known as "center point steering".

The cylindrical portion 120 of the operating connections of each of the front wheel brakes is perforated to receive a lever 130 extending through a cut away portion of the bearing 122 and which is pivotally connected to a link 132 suitably curved (Fig. 5) to avoid the knuckle 126, and connected at its opposite end to adjustable toggle links 134 connected to the ends of an internal expanding brake band 136 arranged to be moved by straightening movement of the toggle into frictional engagement with the internal surface of a drum 138, one of which is secured to each of the wheels 128. The idle position of the band 136, when it is contracted by return springs 140 and 142, is determined by three adjustable stops 144 carried by brackets 146 riveted or otherwise secured to the plate 124. The band 136 may, if desired, be in the form of the usual pivotally connected brake shoes, but I prefer that it be in the form of a continuous metal band 148 having linings 150 and 152 and provided with a U-shaped anchor member 154 riveted or otherwise secured thereto and slidably engaging a stationary block 156 bolted or otherwise secured to the stationary plate 124.

The extreme positions of the telescoping shaft, and therefore of the arm 112, are determined by a stop 158 having an opening surrounding the lever 130 and held in place by a nut 160, which stop is shown in Fig. 5 an engaging one end of a cut-away portion in the bearing 122. This cut-away portion is long enough to permit of maximum movement of the telescoping shaft in applying the brakes. In the position shown in Fig. 5, the stop 158 is in the position it occupies when the brake is off and in which position it determines the idle position of all of the various parts. It will be seen that with the parts in their idle position, as determined by this stop, the arm 112 is inclined forwardly to a sufficient extent so that it will be approximately vertical when the brakes are on.

The sleeve portion 114 of the telescoping shaft is connected to the cylindrical portion 120 supported on the knuckle 126 by a universal joint having a portion movable about a substantially horizontal axis 170 to allow for relative movement of the frame 10 and the axle 16 due to action of the springs 12, and having a portion movable about a generally vertical axis 172 which is very nearly in the line of the axis of the king pin connecting the knuckle 126 and the axle 16,—that is, very nearly in the steering axis of the wheel. In order to secure the desired release of the outer front brake on a turn, however, the axis 172 is not exactly coincident with and does not intersect the steering axis; in a projection on a transverse vertical plane it intersects the steering axis just above the telescoping shaft in such a manner as to form with the steering axis an angle of approximately seven and one-half degrees, and in a projection on a longitudinal vertical plane it intersects the steering axis at the center of the universal joint to form an angle of approximately seven and one-half degrees.

The operation of the universal joint, due principally to the angle between the steering axis and the vertical axis of the universal joint, and due partly to offsetting axis 172 inwardly from the steering axis, to release the outer brake, is shown diagrammatically in Figs. 6 to 11. In these figures, the parts are shown with the brakes off in Figs. 6, 7 and 8, and with the brakes on in Figs. 9, 10 and 11. Considering first Figs. 6, 7 and 8, it will be seen that when the front wheels are swiveled to turn to round a corner to the right, the left wheel becomes the outside wheel and turns through an angle of twenty-nine degrees, while the right wheel becomes the inside wheel and turns through an angle of thirty-eight degrees. As the wheels turn about the steering axes, that is about the center lines of king pins, which, as will be apparent from Figs. 7 and 8, are not exactly vertical, the centers of the axes 172 turn respectively through arcs of twenty-nine degrees and thirty-eight degrees on radii $R^1$. The tops of the axes 172 turn respectively through arcs of twenty-nine degrees and thirty-eight degrees on axes $R^2$; and the bottoms of axes 172 turn respectively through arcs of twenty-nine degrees and thirty-eight degrees on radii $R^3$. As will be apparent from Fig. 6, which, it should be borne in mind, is on a scale four times as large as Figs. 7 and 8, the axes 172 are brought from the full line positions to the dot-and-dash line positions. As appears in Figs. 7 and 8, this swinging of each axis 172 generates a curved or warped surface of general conical form about the center line of the king pin as a central axis. Obviously, this change in the position of each axis 172 rocks the above described telescoping shaft about its longitudinal axis, thus moving the center line of the lever 112 from the full line position in Fig. 8 to the dotted line position for the outside or left wheel, and to the dash line position for the inside or right wheel, thus slightly loosening the connections for the outside wheel, this being allowed for by the lost motion connection between the link 110 and the arm 108, while there is substantially no movement of the lever 112 for the inside wheel except for a very slight tightening which is provided for in adjusting the brake so that it does not at this time bring the band into frictional engagement with its drum.

In the operation of the parts as described above, there is no effect on the action of the brakes inasmuch as the brakes are at this time off or in idle position. The same arrangement of the connections, however, as illustrated diagrammatically in Figs. 9, 10 and 11, operates to produce the desired differential action in rounding a corner. As will be apparent from Fig. 9, corresponding to Fig. 6 but showing the brakes on, the axes 172, which are very nearly in a vertical plane at this time, swing about radii $R^1$, $R^{22}$ and $R^{32}$, the last two of which are somewhat different from the radii $R^2$ and $R^3$ about which the axes swing when the brakes are off; but, as will be apparent by comparing Figs. 9, 10 and 11 respectively with Figs. 6, 7, and 8, the general effect produced is very similar in that these axes describe warped surfaces approximating cones in a manner which causes the telescoping rock shafts to swing about their longitudinal axes in a manner to loosen very substantially the brake on the outer wheel and to tighten slightly the brake on the inner wheel. The three positions of the lever 112 corresponding to the position with the brakes on and the wheels straight ahead, with the brakes on and the wheel on the outside of the turn, and with the brakes on and the wheel on the inside of the turn are shown respectively in full, dotted, and dashed lines in Fig. 11, the front of the car being toward the right in this figure. It will be seen that the lever 112 for the outer brake would, if held under tension, be pulled back to the dotted line position to an extent practically equal to its original movement in applying the brakes. What actually happens is that the tension on the lever is loosened and the brake is completely released, with a comparatively small actual movement of the lever. That is to say, instead of the lever 112 turning to the dotted line position in practice, due to the fact that the front brakes are not equalized and that therefore the shaft 90 cannot rock any further to maintain the tension on the outer lever 112, the lever does not actually move to any great extent, but the part 120 and the operating lever 130 (Fig. 5), which operate the brakes, turn in a direction to release the brake and in an amount to compensate for the movement of the lever 112 which would otherwise take place. Obviously, this brings the parts substantially to the positions shown when the brake is off. The lever 112 for the inner wheel, on the other hand, is swung in a direction which tends to tighten the brake, this movement being resisted by the brake itself and therefore partly tightening the brake and partly reacting on the brake pedal. Since the front and rear brakes are equalized through the bar 100, however, this tightening is distributed among the three brakes which remain on in rounding the corner, with the result that the retarding effect on these three wheels is increased, partly to compensate for the loss of retarding action on the outer front wheel. Thus the pressure on the brake pedal remains substantially the same, and for all practical purposes in controlling the car the braking effect remains substantially the same, while at the same time there is no possibility of loss of control of the car, since it is utterly impossible to lock the outer front wheel and there must therefore always be one of the dirigible wheels which is rolling except in the very exceptional case where skidding would take place even without any brakes.

Briefly outlining the method of procedure, the operator, by means of the brake pedal, puts the links 86 and 84 under tension to apply the brakes. Considering rod 86 it may be regarded as at rest under a pull from each end, the pull at the front end being the force exerted by the brake. If now heat expands the drums, the pull on the front end of 86 is released. In a similar way the increased grip of the rear brake gives a greater pull on the rear end of link 84. These movements are taken care of by the equalizer with no change in the effort exerted by the driver upon the pedal. Obviously, too, the movement of parts 84, 86 and the equalizer lessens the braking action at the rear and restores it at the front. There is an increased pull upon 84 but this is balanced through the equalizer, which takes up the slack which was given to the rod 86.

The dotted line and the dash line positions of lever 112, as shown in Figure 8 and Figure 11, indicate the positions which the lever 112 takes or tends to take as a result of the swinging of the wheel without any change in the relative position of the brake drum and band. It should be kept in mind also that of the link connection, the member 86 is not to move, but that member 110 may move relative to 86 because of the provision of the lost motion connection at 108. The tendency of lever 112 on the inside wheel to move to the dash line position in Figure 8 and in Figure 11, without change in the relative position of brake band and drum, is resisted by the non-extensible characteristic of link 84—110. The lever 112 is therefore compelled to remain substantially in the full line position. This is equivalent to a pull upon lever 112 from the dash line to the full line position, which, of course, tends to and does apply the brake to the inside wheel, and that, too, without any change on the part of the brake pedal or any movement on the part of linkage 86 and 110. On the other hand, the tendency of lever 112 at the outside wheel to swing to the dotted line position is not resisted, because of the lost motion connection in the linkage.

As explained above, one of the important features of my invention relates to the novel manner of equalizing the front and rear brakes so that the brakes of one set actually operate at times to apply the brakes of the other set. Thus, as explained above, the rear wheel brakes are tightened by the inner front brake when rounding a corner to preserve approximately equal braking action when the outer brake is released. These improved equalizing connections also provide for compensating for the expansion of the brake drums due to the heat developed by the braking friction on a long hill. In such a case, as the drums on the four wheels expand, they tend to leave the internal bands of the front wheel brakes, thus tending to release the front brakes, while at the same time they tend to tighten the rear wheel brakes. If all the brakes were of the same kind, or if the novel equalizing connections were not provided, the braking action would thus change materially as the drums expanded. However, by providing for one set of brakes which tend to tighten connected by such equalizing connections to another set of brakes which tend to release, uniformity of action is secured in that the tightening brakes operate through the equalizing connections to tighten the releasing brakes, while at the same time they release themselves.

While one illustrative embodiment of the invention has been described in detail, it is not the intention to limit its scope to this particular embodiment or otherwise than by the terms of the appended claims.

In defining the brakes in the claims, the term "band" is used, not as a limitation to any particular form of retarding member, but as a convenient generic designation for any desired form of friction device.

I claim:

1. A vehicle comprising, in combination, front and rear wheels, each wheel having a brake including a drum and a friction member movable into engagement with the drum, connections between the front set of brakes and connections between the rear set of brakes, the front and rear sets of brakes being so constructed and arranged that the brakes of one set tend to release as the drums become heated and the brakes of the other set tend to tighten as the drums become heated, together with mechanical connections between the brakes operated by tightening of the brakes of one set to tighten the releasing set of brakes, thus causing substantially uniform braking action regardless of the temperature of the drums.

2. A vehicle comprising, in combination, front and rear wheels and corresponding front and rear sets of brakes, each brake including a drum and a friction member movable into engagement therewith, connections between the front set of brakes and connections between the rear set of brakes, the brakes of one set being constructed and arranged to tend to release as the drums become heated and the brakes of the other set being constructed and arranged to tend to tighten as the drums become heated, together with connections including an equalizer between the front and rear sets of brakes which operates as described to tighten the releasing brakes and release the tightening brakes to provide substantially balanced braking effect regardless of the temperature of the drums.

3. A vehicle comprising, in combination, rear wheels having brakes including drums and which tend to tighten as the drums become heated, front wheels having brakes including drums and which tend to release as the drums become heated, and equalizing link connections between the front set and rear set of brakes operating as described to tighten the front brakes and loosen the rear brakes as the drums become heated to provide substantially balanced and uniform braking action regardless of the temperature of the drums.

4. A vehicle comprising, in combination, front and rear wheels and corresponding front and rear sets of brakes, the one set of brakes including drums and external contracting friction bands cooperating therewith, and the other set of brakes including drums and internal expansible friction bands cooperating therewith, together with equalizing connections between the front set and rear set of brakes which operate as described to tighten the internal expanding bands as their drums become heated and to release the external contracting bands as their drums become heated to provide substantially uniform braking action regardless of the temperature of the drums.

5. A vehicle comprising, in combination, rear wheels having brakes including drums and external contracting friction bands, front wheels having brakes including drums and internal expanding friction bands, and link connections including an equalizer between the front and rear brakes.

6. A vehicle comprising, in combination, front and rear wheels, each wheel having a brake including a drum and a friction member movable into engagement with the drum, link connections between the front set of brakes and connections including an equalizer between the rear set of brakes, operative connections including an equalizer between the two sets operated by tightening of the brakes of one set to tighten the releasing set.

7. A vehicle comprising, in combination, rear wheel brakes, front wheel brakes, link connections between said brakes, means including a movable operating lever constructed and arranged to release the outer brake on a turn, and equalizing connections between the front and rear wheel brakes constructed and arranged equally to tighten slightly the other three brakes on a turn partly to compensate for the release of the outer brake.

8. In a system of brakes for vehicles, a brake for each wheel, linkage including an equalizer between said brakes whereby, when making a turn, the brake on the outer front wheel will be automatically released and the braking action of the other three wheels will be increased.

In testimony whereof I affix my signature.

ERNEST W. SEAHOLM.